United States Patent
Viaud

[11] Patent Number: 5,170,701
[45] Date of Patent: Dec. 15, 1992

[54] TWINE ARM ARRANGEMENT

[75] Inventor: Jean Viaud, Sarreguemines, France

[73] Assignee: Deere & Company, Moline, Ill.

[21] Appl. No.: 834,180

[22] Filed: Feb. 7, 1992

[30] Foreign Application Priority Data

Feb. 19, 1991 [DE] Fed. Rep. of Germany ....... 4104995

[51] Int. Cl.⁵ .............................................. B65B 13/02
[52] U.S. Cl. ........................................ 100/2; 100/5; 100/13
[58] Field of Search ................... 100/2, 5, 13, 15, 88; 56/341, 343

[56] References Cited

U.S. PATENT DOCUMENTS

| | | | |
|---|---|---|---|
| 3,064,556 | 11/1962 | Luebben | 100/13 X |
| 4,158,331 | 6/1979 | Campbell et al. | 100/5 |
| 4,248,143 | 2/1981 | Gaeddert | 100/13 X |
| 4,517,889 | 5/1985 | Walker et al. | 100/5 |
| 4,557,189 | 12/1985 | Schaible | 100/13 X |
| 4,649,812 | 3/1987 | Mouret | 100/13 X |
| 4,793,249 | 12/1988 | Wellman | 100/13 |
| 4,800,811 | 1/1989 | Wellman | 100/13 X |
| 4,885,990 | 12/1989 | Mouret | 100/13 X |
| 4,998,469 | 3/1991 | Diederich, Jr. | 100/2 |

FOREIGN PATENT DOCUMENTS

| | | | |
|---|---|---|---|
| 0041444 | 12/1981 | European Pat. Off. | 100/5 |
| 0085817 | 8/1983 | European Pat. Off. | 100/5 |
| 1261581 | 10/1986 | U.S.S.R. | 100/5 |
| 2150073 | 6/1985 | United Kingdom | 100/5 |

Primary Examiner—Harvey C. Hornsby
Assistant Examiner—Stephen F. Gerrity

[57] ABSTRACT

The binder twine arm arrangement includes two arms having twine dispensing ends. The arms initially remain in a rest position wherein their dispensing ends are near a first end face of a bale to be bound. The arms are moved to a start position wherein the dispensing ends are located centrally between the first end face and a second end face of the bale. The arms are then actuated or controlled such that they first spread apart and then return together about a hinge joint interconnecting the two arms. Upon returning to the start position the arms are returned to the rest position. For this purpose, an actuator is provided between the two arms which becomes active to effect relative motion between the arms as soon as the arms have reached the start position.

9 Claims, 6 Drawing Sheets

TWINE ARM ARRANGEMENT

BACKGROUND OF THE INVENTION

The present invention concerns a twine arm arrangement used in the binding of a cylindrical bale made in the baling chamber of a round baler and more particularly relates to such an arrangement including two twine arms for the guidance of the binding material to a start position in engagement with the bale, the arms being movable relative to each other along the longitudinal axis of the bale by an actuating arrangement and being together when occupying a rest position at or near an end face of the bale. Furthermore, the invention concerns a method or process for binding a bale.

Twine arm arrangements are used in wrapping a cylindrical bale formed by an agricultural round baler with twine after it has been formed in the baling chamber of the baler in order to prevent it from falling apart. In such wrapping, the twine is initially wrapped with the crop and subsequently wound around the circumference of the bale in a multiplicity of turns. The windings are woven over the entire width of the bale by means of movable arms, of the arm arrangements, that guide the twine along the longitudinal axis of the bale, while the bale continues to be rotated in the baling chamber. After a sufficient number of turns, the twine is cut from the supply roll and the bale released. The end or ends of the wrapped twine hang down from the bale to a greater or lesser length, while the remainder of the wrapped twine remains on the surface of the bale due to its friction.

In conventional balers a problem has been shown to exist in that the baling process cannot be continued during the binding process and that a large quantity of twine, 50 to 80 meters for example, is required for binding each bale.

To relieve these problems it has been proposed (see Russian Patent No. SU-A1-1261-581, dated Oct. 7, 1986 and U.S. Pat. No. 4,793,249 granted Dec. 27, 1988) to supply the twine through two arms in order to reduce the binding time by one-half. Since both arms are guided over the entire width of the bale twice, the twine requirement is nevertheless still very high.

SUMMARY OF THE INVENTION

According to the present invention there is provided an improved twine arm arrangement and binding process that overcomes the deficiencies noted above associated with the prior art arrangements.

An object of the invention is to provide a binder arrangement including a twine arm arrangement operative for applying twine to a bale such as to make do with little twine or other binding material and such that there is a tight adherence of the twine on the bale.

A more specific object of the invention is to provide a twine arm arrangement including a pair of twine arms which are movable together from a rest to a start position, wherein the twine dispensing ends of the arms are adjacent a central location between opposite end faces of a bale being bound, and are then movable relative to one another, the relative movement of the arms being such as to bind the bale with two layers of twine applied along the length of the bale instead of four layers as is the case with prior art devices.

It is a specific object of the invention in accordance with a first embodiment of the invention, as set forth in the immediately preceding object, to mount the pair of twine arms for movement together about a first axis and to mount one of the twine arms to the other for relative movement about a second axis extending parallel to the first axis and to provide a first linear motor for causing the arms to be pivoted together and to provide a second linear motor for effecting relative movement between the arms; and in accordance with a second embodiment of the invention to effect relative movement between the arms by means of a fixed cam which is engaged by a follower carried by one of the arms when the arms arrive at the start position.

These and other objects will become apparent from a reading of the ensuing description together with the appended drawings.

Figures 1, 2:
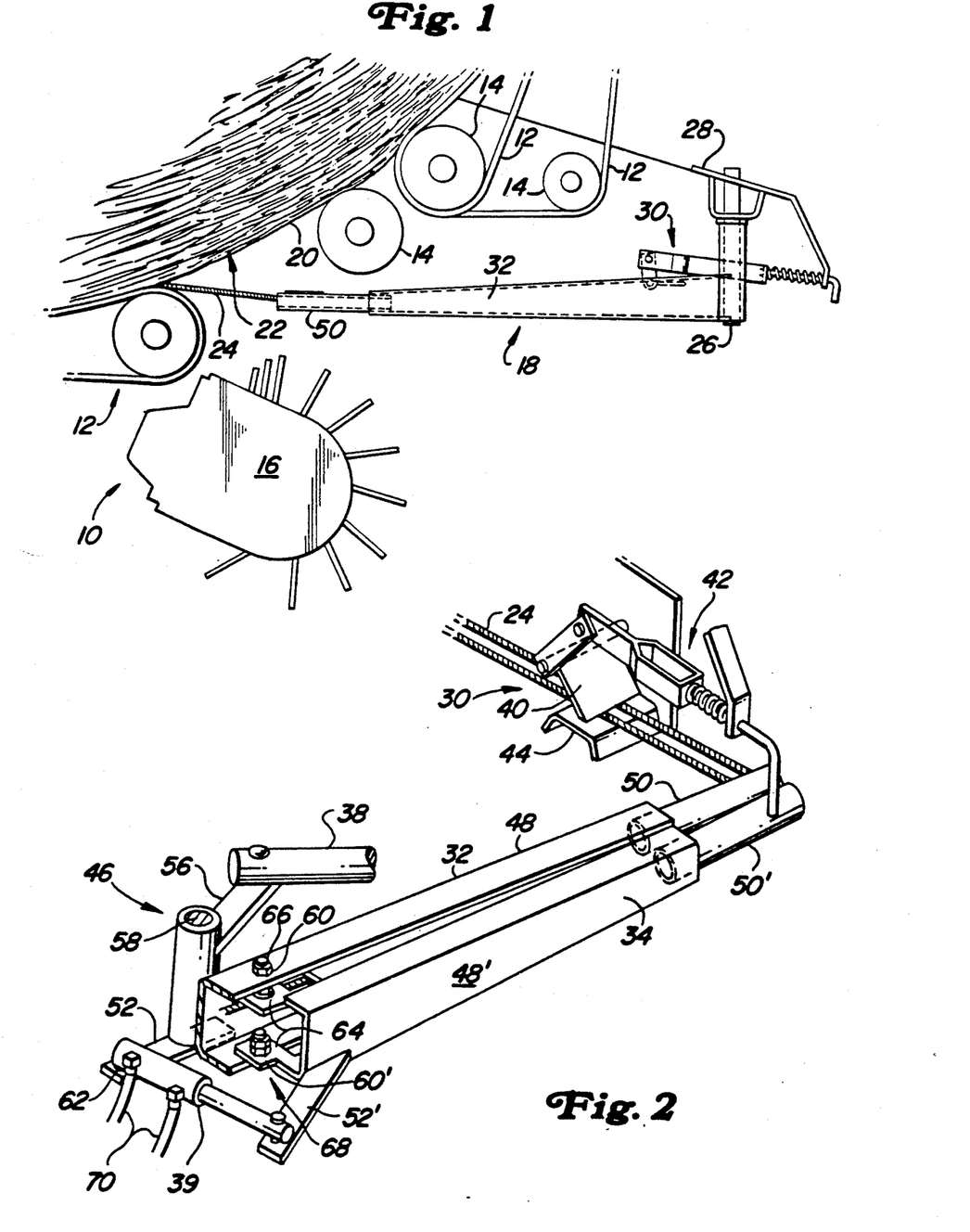
FIG. 1 is a right side elevational view of a region of a round baler with a binder twine arm arrangement constructed in accordance with the principles of the present invention.
FIG. 2 is a perspective view of the twine arm arrangement of FIG. 1.

Referring now to FIG. 1, therein is shown a lower forward region of a round baler 10 including several belts 12 supported by and guided over rollers 14, a crop collecting arrangement 16 and a binder arm arrangement 18. Since the round baler 10 is otherwise conventional, a more detailed description is omitted.

The belts 12 define part of an expansible baling chamber in which a bale 20 is formed from crop received by the baling chamber from the crop collecting arrangement or pick-up 16 which takes up crop deposited on the ground and conveys it upward and to the rear under the binder arm arrangement 18 through an inlet 22 into the baling chamber where the crop is initially rolled into a bale core upon which develops into the bale 20 after additional crop is spiral would about the core. It is to be understood that the binder arm arrangement 18 could just as well be used with a baler having a fixed volume baling chamber.

The binder arm arrangement 18 is intended to wrap binding twine 24 around the bale 20 after its formation, for which purpose it is journalled on a support post 26 carried by a frame member 28 of the baler 10 for pivoting in, or generally in, a horizontal plane. The configuration of the arm arrangement 18 is described in more detail below with reference to subsequent figures. It is here to be noted that when used with different baler embodiments the arm arrangement 18 may be mounted to pivot in a vertical or nearly vertical plane.

Figure 3:
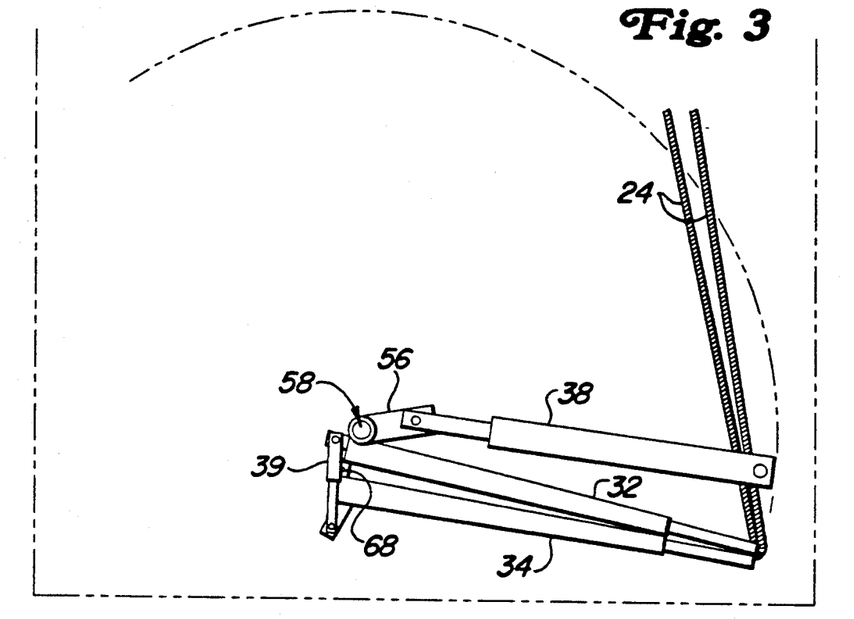
FIGS. 3-6 are schematic plan views of the twine arm arrangement respectively showing the twine arms in a position of rest, a start position, during a first part of a binding process and during a second part of the binding process.

The binder arm arrangement 18 is associated with a twine cutting arrangement 30 that is actuated as soon as the arm arrangement 18 reaches its rest position shown in FIGS. 2 and 3.

According to FIG. 2, the arm arrangement 18 is located in the forward part of the baler 10 where it would be underneath a drawbar (not shown) and includes two twine arms 32 and 34, a first linear motor 38 and a second linear motor 39, the motors forming part of an actuating arrangement for the arm arrangement 18.

The support post 26 is configured as a simple cylindrical steel rod that extends substantially vertically downward from the drawbar and contains a retainer, such as a cotter pin (not shown) to secure the arm 32 on the post.

Figure 4:
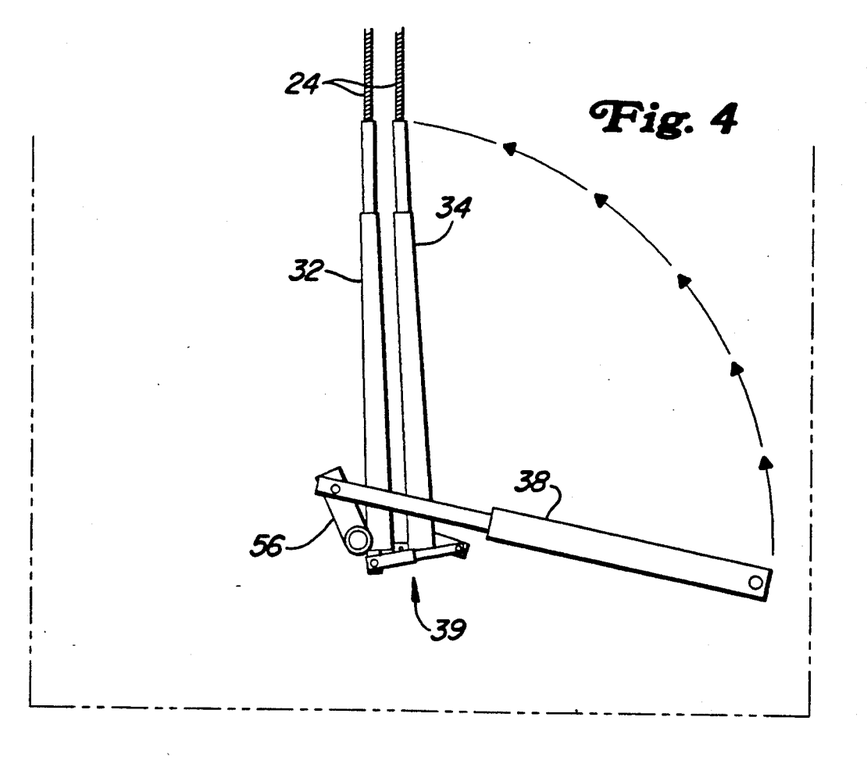

The cutting arrangement 30 is also of conventional design (see U.S. Pat. No. 4,793,249, granted Dec. 27, 1988) including a knife 40 that is forced by a linkage 42 against an anvil 44 to cut the twine 24 as soon as the arms 32, 34 make contact with the linkage 42. After being cut, ends of the strands of the twine 24 hang from dispensing ends of the arms 32, 34 such that they can be grasped by crop being delivered to the baling chamber once the arms are swung to their start position (FIG. 4).

The arm 32 consists of a bearing housing 46, an elongate channel-like part 48 of U-shaped cross section, a tube 50 and a retaining bracket 52. Specifically, the bearing housing 46 includes a cylindrical sleeve 54, received on the post 26, and a control arm 56 and is welded to one end of the part 48.

In this embodiment of the arm arrangement 18, the control arm 56 extends generally tangentially from the upper end region of the sleeve 54 while its longitudinal centerline is directed at an angle of approximately 30° to the longitudinal centerline of the part 48. There is a rigid connection between the sleeve 54, the control arm 56 and the part 48. In the end opposite the sleeve 54, the control arm 56 is provided with a bore that engages a connecting device (not shown) such as a screw, a journal, a pin or the like, that connects it to the linear motor 38.

The part 48 of the arm 32 forms the major portion of the length of the arm and is so arranged that the base of the part 48 is joined to the bearing housing 46. At the end of the part 48 opposite the bearing housing 46, that is, the end region towards the cutting arrangement 30 when the arm arrangement is in its rest position, the tube 50 is welded into the interior of the channel-like part 48 and forms an extension thereof which serves as a twine dispensing end of the arm 32. The tube 50 occupies approximately one-quarter of the length of the arm 32 and is located where it can come into contact with the linkage 42 of the cutting arrangement 30 so as to effect cutting of the twine strands carried by the arm arrangement 18 as the latter returns to its rest position. The twine 24 is threaded so as to extend within the channel-like part 48 and exit through the tube 50. In the region of the bearing housing 46, both legs of the part 48 are provided with a bore 60, the bores 60 being disposed in axial alignment and serving to form a pivot joint as described below. The bore 58 of the sleeve 54 and the bores 60 are separated from each other nearly by the height of the legs of the part 48 and the wall thickness of the sleeve 54.

The retaining bracket 52 is in the form of a strap and extends from radially from the bearing housing 46 is a direction approximately diametrically opposite to the part 48. At its free end the bracket 52 is provided with a bore 62 to which the cylinder end of the linear motor 39 is connected.

The arm 34 is similar to the arm 32 in that it includes an elongate channel-like part 48' which is U-shaped in cross section and a tube 50' that forms an extension of the part 48' and serves as the twine dispensing end of the arm 34. The arms 32 and 34 are disposed such that their legs extend toward each other. Joined to the web of the arm 32 at the opposite end of the arm from the tube 50' is a retaining bracket 52' having its longitudinal centerline inclined at an angle of approximately 30° to that of the part 48', the bracket 52' extending generally in the same direction as the retaining bracket 52. The rod end of the motor 39 is connected to bracket 52'.

Hinge or joint plates 64 extend from the inner side of the legs of the channel-like part 48' into the interior of the channel-like part 48, and are also provided with axially aligned bores 60'. The bores 60 of the part 48 are respectively aligned with the bores 60' of the part 48' and received through each set bores 60, 60' is a hinge screw 66 which together with the bores forms a hinge or pivot joint 68. Instead of the two screws 66, a single hinge pin could be inserted through both sets of aligned bores to form a hinge or pivot joint. The two arms 32 and 34 are thus connected for movement together and for movement relative to each other such that they can be swung between a first position wherein they contact or extend substantially parallel to each other and a multiplicity of other positions in which their free, twine dispensing ends are more and more distant from each other. The purpose of the linear motor 39 is to provide a means by which the arms 32 and 34 may be moved relative to each other about the joint 68.

The linear motors 38 and 39 may be constructed as electric, hydraulic or pneumatic motors. These linear motors 38, 39 may be operated as double-acting devices, that is, they may be moved in both directions by the same energy source, or they may be single-acting, where one of the movements is performed by a spring or by a force resulting from the tension of the twine 24.

The extent and timing of the change in length of the linear motors 38, 39 is controlled by a small computer, not shown, that is preferably programmable, and is a possible further component of the actuating arrangement, in which the diameter, the width, the number of turns of wrapping and other values can be supplied as input. The movements of the linear motors 38, 39 may be continuous as well as in small steps.

In the schematic FIGS. 3-6, typical positions of the arm arrangement 18 with the arms 32, 34 are shown, and explained in the following.

FIG. 3 shows in arm arrangement in its rest position, in which the linear motor 38 is retracted and the further linear motor 39 is extended. Here the arms 32, 34 are in contact with the cutting arrangement 30 and their free ends are located at or near an end face of the bale 20. In addition, the arms 32, 34 are in contact with each other. Finally the binding material or twine 24 around the bale 20 just wrapped has not been cut and hence extends between the ends of the tubes 50, 50' and the inlet 22.

FIG. 4 shows the binding arm arrangement 18 in its start position in which the linear motor 38 is extended half-way and the further linear motor 39 is still extended. In this position, the arms 32, 34 are located with their free ends immediately ahead of the baling chamber inlet 22, so that the now freely dangling ends can be drawn with the mass of the crop conveyed by the crop collecting arrangement or pick-up 16 into the baling chamber. The two arms 32, 34 are still in contact with each other.

Figure 5:
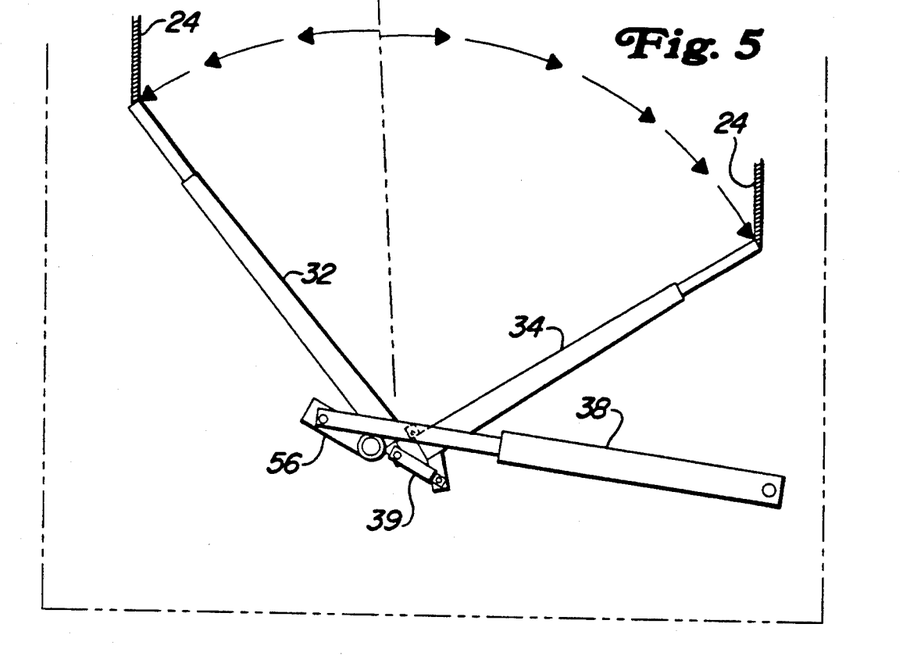

FIG. 5 shows the binder arm arrangement 18 in a position in which the linear motor 38 is fully extended and the further linear motor 39 is fully retracted. Hence the free ends of the arms 32, 34 are still located directly before the inlet 22 into which the two strands of twine 24 extend; but they are located very near the end face of the bale 20, that is, they have completed the first half of the binding path, the "out movement". The two arms 32, 34 occupy the most divergent position since the two retainer brackets 52, 52' have been pushed towards each other by the retracting motor 39 and that the arm 32 has been swung beyond the start position by further extension of the linear motor 38.

Figure 6:
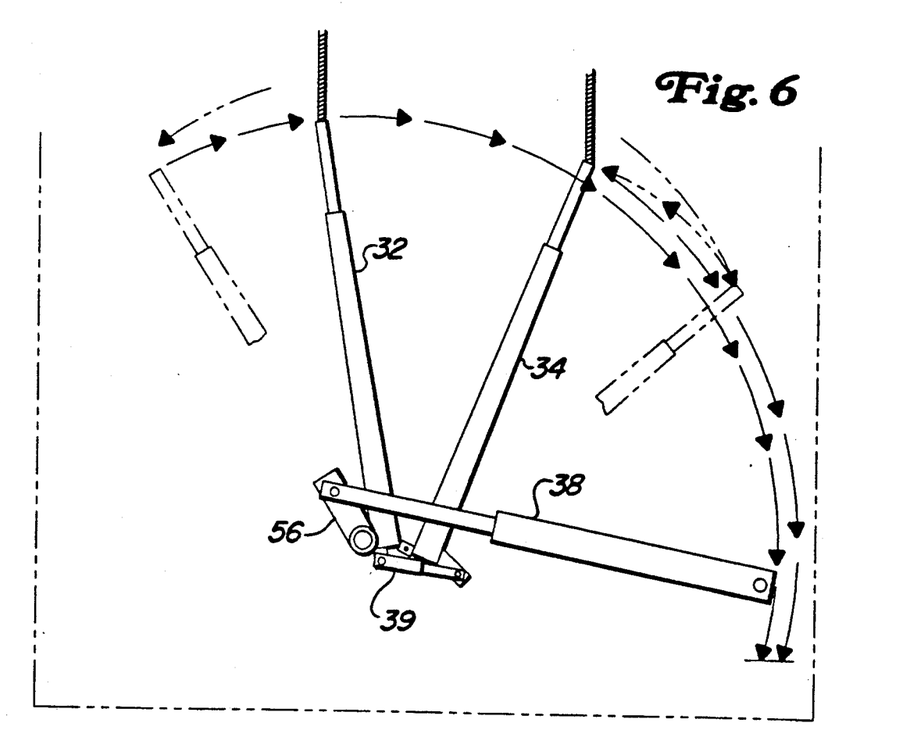
Figure 7:
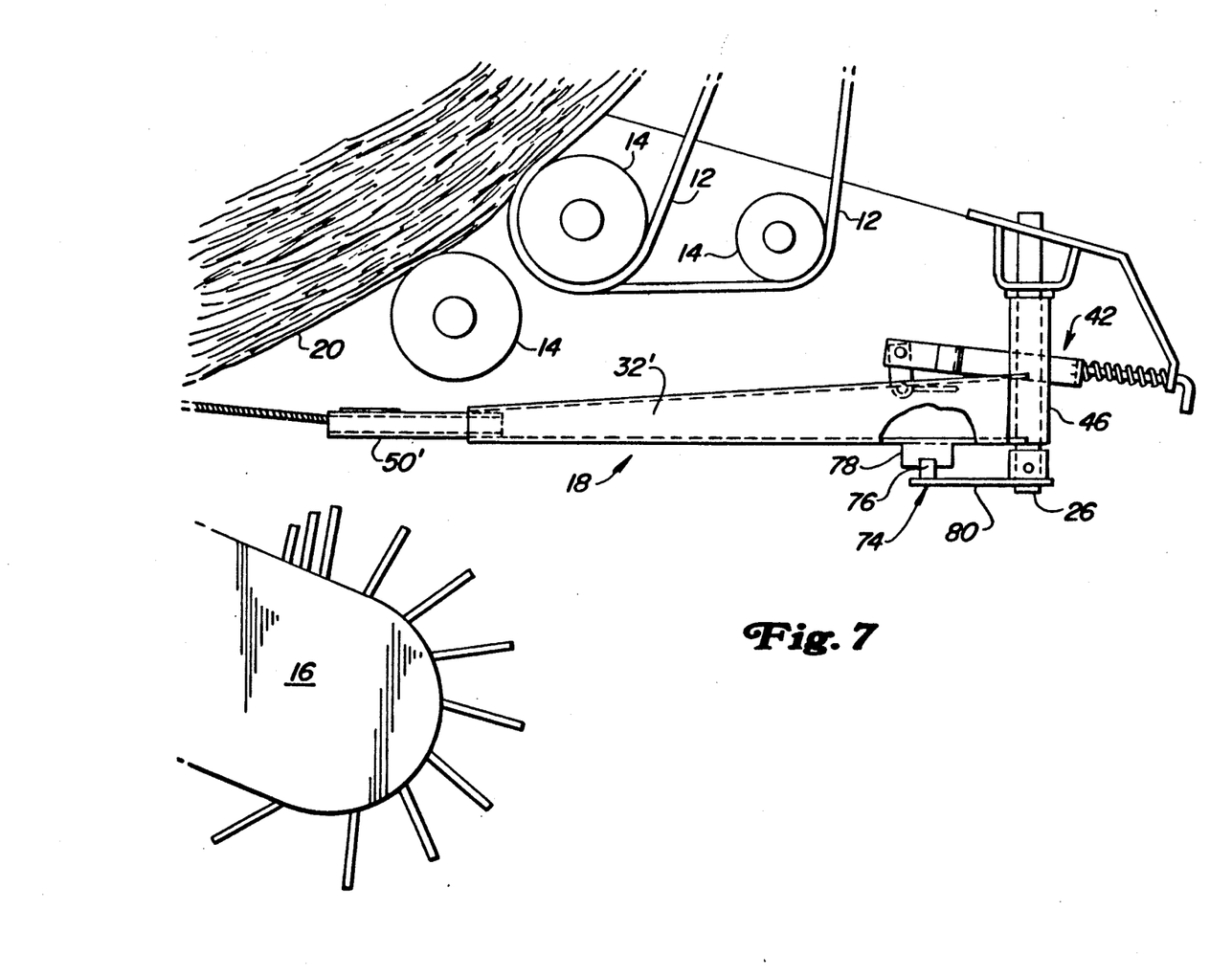
FIG. 7 is a right side elevational view of a region of the round baler showing a second embodiment of the twine arm arrangement.
Figure 8:
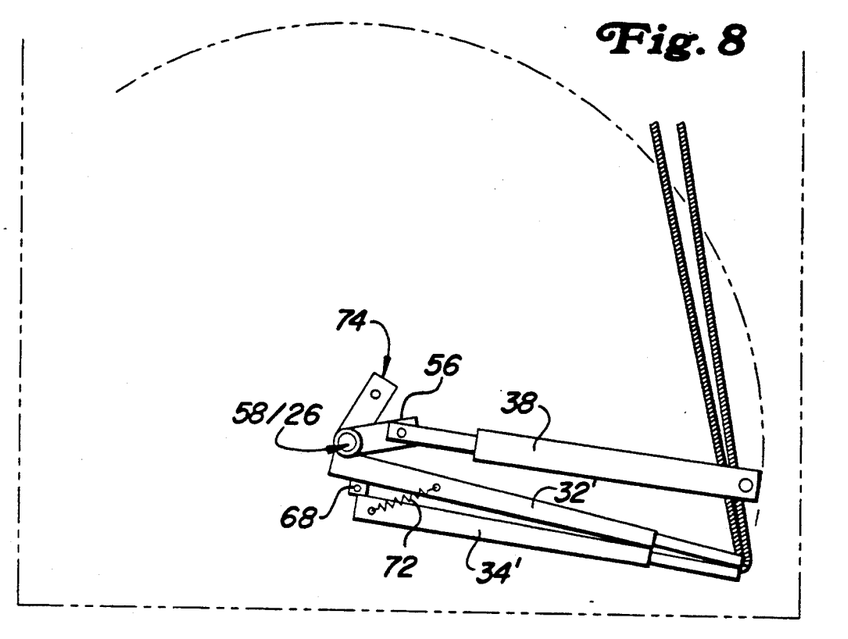
FIGS. 8-11 are schematic plan views of the twine arm arrangement of FIG. 7 respectively showing the twine arms in a position of rest, a start position, during a first part of a binding process and during a second part of the binding process.

Finally, FIG. 6 shows how the two arms 32, 34 are moved towards each other in direction of the start position by once again contracting the motor 38 and extending the motor 39. Depending on the programming of the small computer, the movement of the arms 32, 34 can be so controlled that they come together at the start position and only then return together to the rest position, or they are moved in the direction of the rest position shortly before reaching the start position, at which point they come together.

It is important that the binding process ends at the center of the width of the bale or close to it, so that the last turns of the binding material, whose ends finally reach the one end face of the bale 20, cannot slide off too easily from the circumference of the bale 20 during subsequent handling of the bale 20. In order to reduce the consumption of binding material it is advantageous that the two arms 32, 34 are moved at high speed to the start position, or at least from this position to the rest position, while the binding process itself can be performed at a slower speed.

After reaching the rest position, the two strands of the twine 24 are laid across the anvil 44 and cut by the knife 40 that is actuated by means of the arms 32, 34.

Figure 11:
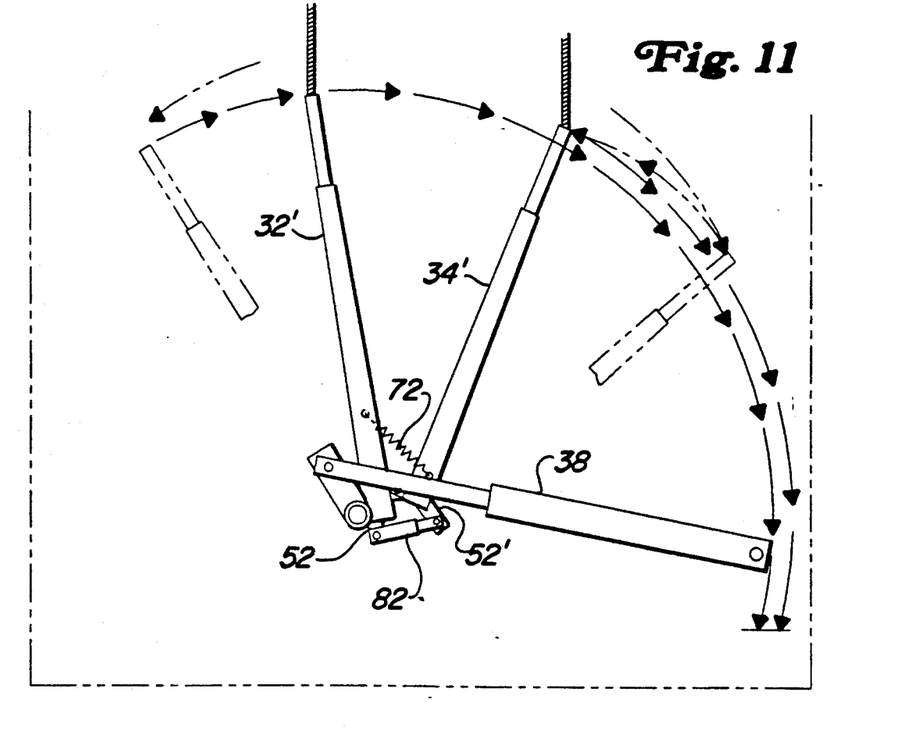

A second embodiment of the arm arrangement is shown in FIGS. 7 through 11. The two arms 32', 34' differ from the arms 32, 34 of the first embodiment in that no retaining brackets 52, 52' are provided, that a spring 72 extends between them and that a stop 74 is attached to the post 26. In this embodiment, the change in the position of the arm 34' with respect to the arm 32' is not performed by a further linear motor 39 or by a motor at all, but by the contact of the second arm 34' with the stop 74. However, as shown in FIG. 11, the retaining brackets 52, 52' may remain on the arms 32', 34' and, instead of having the linear motor 39 connected therebetween, have a damping device or shock absorber 82 connected therebetween, the damping device 82 having a variable degree of damping that controls the speed of movement of the two arms 32', 34' towards each other, that is on their "return movement".

The spring 72 engages either pins, not described in greater detail, or holes in the channel-like parts 48, 48' of the arms 32', 34' and is configured as a helical extension spring, which constantly biases or forces the arms 32', 34' towards each other. Its attaching points are located in the first quarter of the arms 32', 34' as measured from the post 26. The stop 74 comprises a cam 76 fixed to an upper outer end of a strap-like, substantially horizontal arm 80 having its inner end attached to the bottom of the post 26 to thus fix the stop in space. A follower 78 is provided on the underside of the arm 34' and can be brought into contact with the cam 76. If the center of the post 26, the joint 68 and the cam 76 are brought into alignment, as is shown approximately in FIG. 10, then the cam 76 is located radially beyond the pivot axis through the joint 68 from the post 26, that is, the pivot axis of the joint 68 is located between the post 26 and the cam 76.

The entire movement of the assembly consisting of the arms 32', 34'' of the binder arm arrangement 18 is performed by the linear motor 38, with the guidance of the strands of twine 24 from the rest position to the start position and then to the opposite end faces of the bale and back and finally a return to the rest position, and the particular speeds of movement corresponding to those of the first embodiment.

Figure 9:
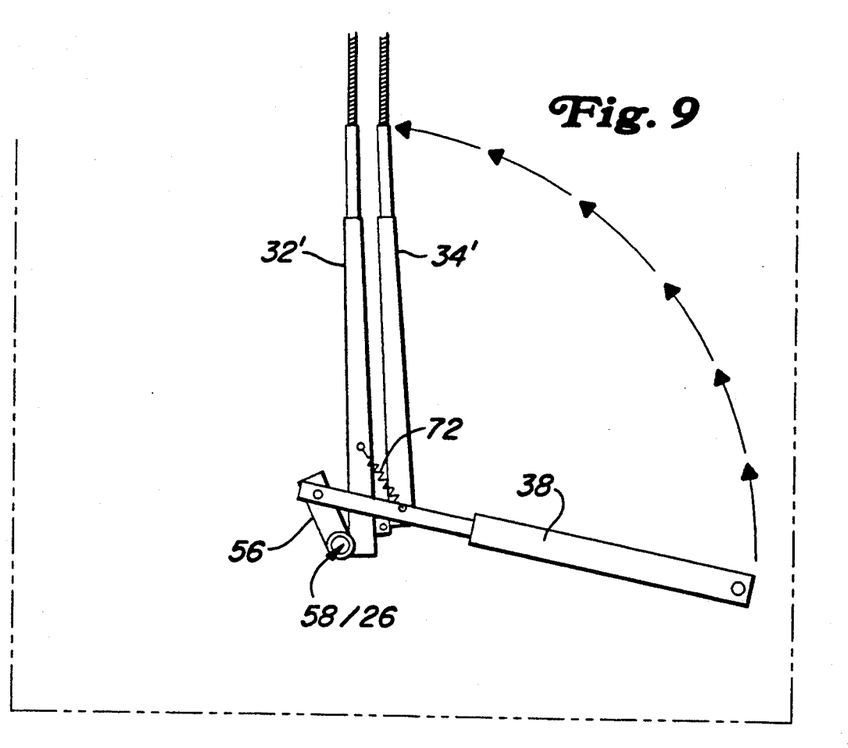
Figure 10:
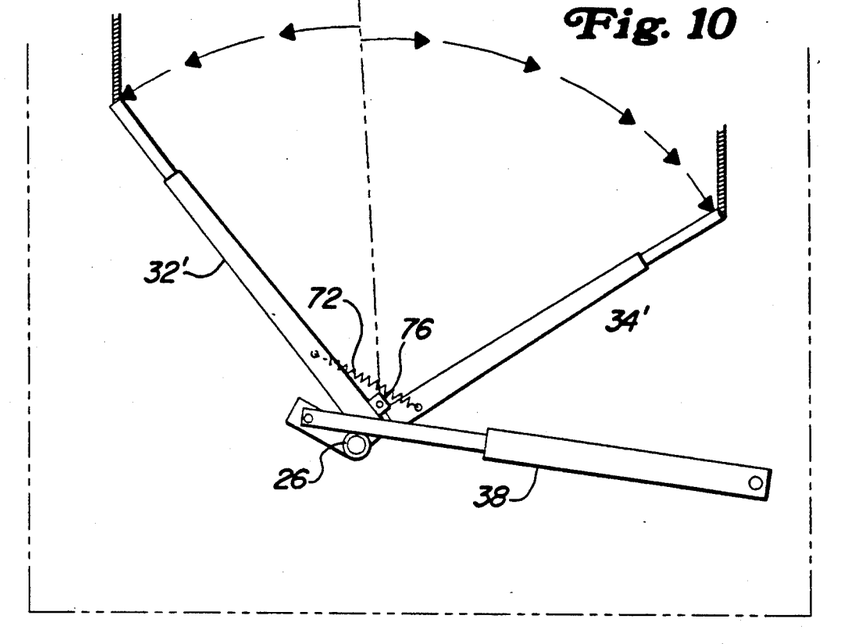

The relative position of the two arms 32', 34' changes only with the start position, which is shown in FIG. 9. In connection with FIG. 10, it can then be seen that the arm 32' is moved beyond the start position towards and extreme position adjacent the right end face of the bale 20 by means of the linear motor 38. By reason of the tension of the spring 72 the arm 34' tends to swing along with the arm 32'. As soon as the two arms 32', 34'' have been swung together so far that the arm 34' with its follower 78 is brought into contact with the cam 76, the inner end portion of the arm 34' is moved together with the joint 68 around the post 26 resulting in the follower 78 sliding inwardly toward the post 26 along the cam 76 and in the arm 34' being swung to position the tube 50' at the left end face of the bale 20. As soon as the linear motor 38 again retracts, the arm 34' is again pulled to the start position by means of the spring 72 from where both arms 32', 34' are moved to the rest position.

The process according to the invention contains as significant steps in the process the fact that the two arms 32, 32' or 34, 34' with their twine dispensing ends are:

a) initially held in a rest position wherein the twine dispensing ends are near a first end face of the bale 20, b) then moved to a start position wherein the twine dispensing ends are close to a central location of the bale between the first end face and a second end face of the bale 20, c) spread from the hinge joint 68 connecting the arms in the direction of the end faces of the bale 20 in mirror-image or generally mirror-image motion, d) moved together in the direction towards the start position, and then e) returned to their rest position.

These process steps can also be performed by binder arm arrangements other than the one disclosed.

In this way the binding process with both embodiments begins only when the arms 32, 34 have reached the start position, as a rule at the center of the bale, so that on the path to that point no binding twine 24 is used. In the center of the bale the strands of twine 24 are held securely. Only after reaching the start position, the arm arrangement 18 acts to bind the bale 20 across its width with two layers of twine, not four-fold as in the current state of the art, whereupon the binding process ends generally in the center of the bale 20. Finally the binding material or twine is guided to the end face of the bale 20 and, as a further advantage, cut off by the cutting arrangement 30 common to both arms.

A short binding time while binding uniformly both halves of the bale 20 is obtained since the arms 32, 34 are moved along paths that are mirror images.

The application of a small computer to vary the speed of motion of the linear motor 38 and also the motor 39 in the first embodiment of the invention allows a multitude of variations in the binding process and in the consumption of binding material.

In the second embodiment of the invention the usage of the stop 74 and spring 72 simplifies and thus makes less expensive the construction of the arm assembly 18. Specifically, due to the spring tension of the spring 72 stretched between the two arms 32, 34 they immediately form a unit, as soon as the follower 78 of the arm 34 leaves the cam 76 of the stop 74.

The use of the damping device 82 between the arms 32, 34, whose degree of damping is variable, if possible, permits the control of the movement of the arm 34 when it is no longer guided along the cam 76.

Thanks to the possibility of controlling the speed of movement of the linear motor 38 for the movement of the complete arm assembly 18, the demand for binding twine may be optimized, since the arm assembly can be moved more rapidly to its rest position after the binding process has been completed.

I claim:

1. In a round baler including a baling chamber defined in part by transversely spaced first and second side walls and a twine arm assembly for dispensing twine for wrapping a large cylindrical bale located within the baling chamber, said twine arm assembly including first and second twine arms including first and second twine dispensing ends and being mounted for pivoting together about a first axis between a rest position wherein the twine dispensing ends are at a rest position adjacent the first side wall and a start position wherein the twine dispensing ends are located centrally between the first and second walls, and an actuator arrangement associated with the twine arms for moving the latter between said rest and start positions, the improvement comprising: said second arm being mounted for pivotal movement relative to said first arm about a second axis extending parallel to the first axis; and said actuator arrangements including first and second actuator means with the first means acting for initially pivoting said arms together from said rest position to said start position and thereafter for moving said first arm from said start position to an extreme position wherein its twine dispensing end is adjacent the second side wall and then back to said start position, and with the second actuator means being operative for moving the second arm back towards said rest position from said start position and then back to the start position, the first actuator means then returning the first and second arms to the rest position.

2. The baler defined in claim 1 wherein said first and second actuator means are operated relative to each other such that the first and second arms are moved from the start position in a mirror-image path to the center of the bale as the first arm moves toward said second side wall and the second arm moves toward said first side wall and then back to the start position.

3. The baler defined in claim 1 wherein a common cutting arrangement for cutting the twine strands carried by both twine arms is provided at or near the rest position and operates to sever the twine strands in response to the twine arms returning to the rest position from the start position.

4. The baler defined in claim 1 wherein the first actuating means of the actuating arrangement is a linear motor connected for pivoting the arms together.

5. The baler defined in claim 4 wherein said second actuator means is a second linear motor connected to the second twine arm for selectively pivoting the latter relative to the first twine arm.

6. The baler defined in claim 5 wherein said first and second twine arms include respective retaining brackets respectively located on the opposite sides of the first and second axes from the dispensing ends of the arms; and said second linear motor being connected between the retaining brackets.

7. The baler defined in claim 4 wherein said second axis is located radially toward said twine dispensing ends from said first axis; said second actuator means including a tension spring connected between the first and second twine arms at a location between said second axis and said twine dispensing ends; a follower fixed to said second twine arm at a location on the opposite side of said second axis from said first axis; and a cam fixed at a location for contacting said follower only after the second arm has reached said start position; whereby said cam acts on said follower to cause said second arm to move back toward said rest position as the first actuator means moves said first arm from said start towards said extreme position and said spring acts to move said second twine arm back to said start position as the first arm is returned to the start position from the extreme position.

8. The baler defined in claim 7 wherein said first and second twine arms includes respective retaining brackets respectively located on the opposite sides of the first and second axes from the twine dispensing ends; and a shock absorber being connected between the retaining brackets.

9. Process for the binding of a cylindrical bale by means of including two twine arms having twine dispensing ends and being movable relative to each other, comprising: controlling the two arms such that they are:
 a) held in a rest position with their dispensing ends near a first end face of a bale,
 b) then moved to a start position with their dispensing ends in the vicinity of a location centrally between the first end face and a second end face of the bale,
 c) then spread apart in mirror-image or approximately mirror-image motion from a joint in the direction of the end faces of the bale,
 d) then moved together in the direction of the start position and
 e) then returned to the rest position.

* * * * *